United States Patent Office 3,458,115
Patented July 29, 1969

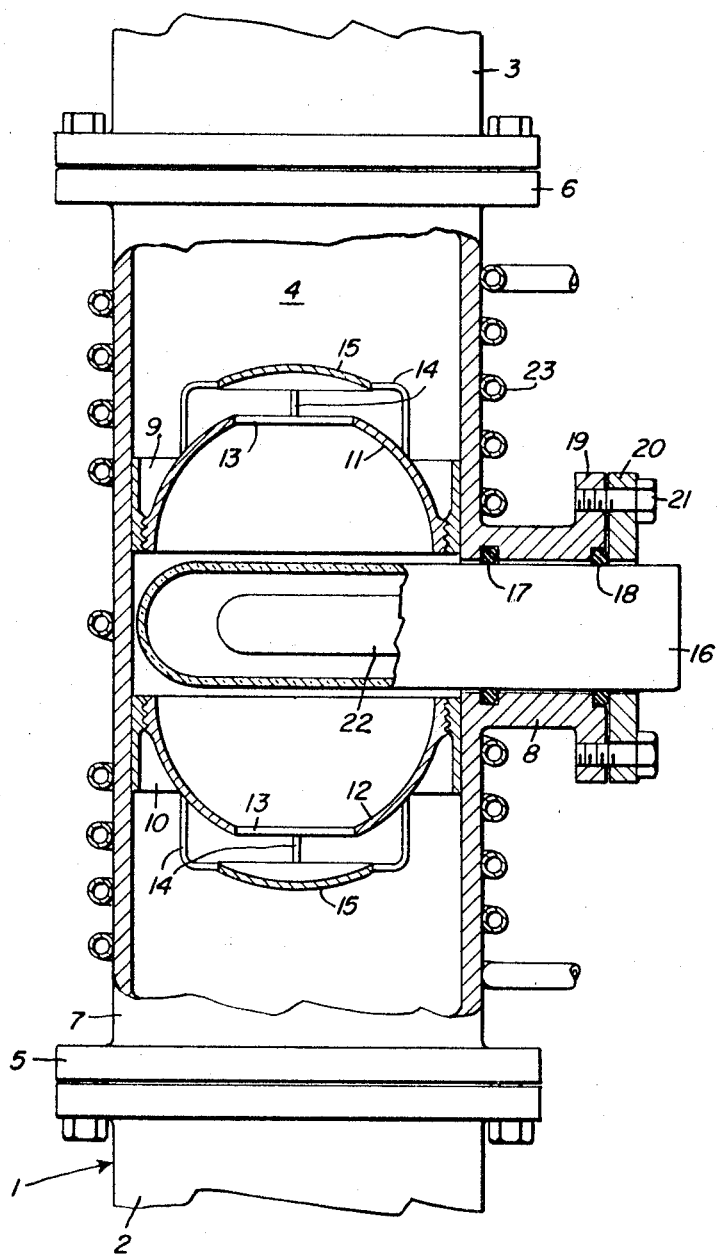

---

3,458,115
TRAP FOR ORGANIC VAPORS IN VACUUM SYSTEMS
Lawrence A. Harris, Schenectady, N.Y., assignor to General Electric Company, a corporation of New York
Filed Oct. 9, 1967, Ser. No. 673,739
Int. Cl. F04b 37/14, 39/04; F04c 29/00
U.S. Cl. 230—69                                     11 Claims

ABSTRACT OF THE DISCLOSURE

A trap for organic vapors from an oil diffusion pump or the like in vacuum systems includes a surface on which unsaturated organic molecules strike and which is irradiated with ultraviolet light or electrons to produce surface polymerization of the molecules. Suitably shaped reflecting or focusing surfaces confine photons or electrons to the trapping region.

---

My invention relates to vacuum systems and in particular to vacuum systems which include a mechanical or oil pump along with other types of pumps to produce extremely low pressures.

A typical evacuating system for producing low pressures employs a mechanical pump as well as additional mercury or oil diffusion pumps. A recurring problem in vacuum systems of this type is contamination of the vacuum chamber by organic molecules which diffuse back or migrate from the oil diffusion pump or the oil-filled mechanical pump. Many expedients have been employed in the past to trap these vapors, including expedients such as the use of surface adsorbents, for example, alumina or zeolite, or the use of cold walls. While these methods are effective, they do not give complete protection from contamination because the trapped oils tend to migrate after the pumps are shut off when the traps are at room temperature.

Accordingly, it is a primary object of my invention to provide a trap for a vacuum system in which oil and similar molecules are changed in character so that they no longer evaporate or migrate over the walls of the vacuum system.

It is another object of my invention to provide new and improved methods and apparatus for removing organic vapors from a vacuum system by immobilizing the molecules of the vapors.

In its broadest aspect my invention provides a method and apparatus by which organic vapors flowing in a vacuum system are deposited on a surface and subjected to radiant energy to polymerize the deposited vapors. In one form, molecules of the vapor, in traveling between spaced points in the system, are deflected to a trapping surface and irradiated with ultraviolet light to produce such polymerization, the trapping surface being removable for maintenance of the apparatus at optimum operating conditions.

The subject matter which I regard as my invention is particularly pointed out and distinctly claimed in the concluding portion of this specification. The invention itself, however, both as to its organization and method of operation, together with further objects and advantages thereof, may best be understood by reference to the following description taken in connection with the accompanying drawing, wherein like reference characters refer to like elements and in which the single figure is a vertical view, partly in section, of a trap embodying my method and apparatus.

The basic principle of my improved method is to modify or trap oil or other organic vapors so that they are no longer mobile and thus cannot contaminate the vacuum system. The action of the trap is based on the surface polymerization of unsaturated organic molecules when the surface which the molecules strike is irradiated with ultraviolet light or with electrons. To effect such polymerization, at least two molecules and a photon must arrive at the same place on a surface at the same time. Where very low pressures are present, the lifetime of an oil molecule on the surface can be extended by cooling the surface. Preferably, however, only moderate cooling is employed so that unpolymerized molecules are not completely immobilized. Once polymerization has taken place, however, there is no danger in warming the trap between pumping cycles.

In the apparatus shown in the drawing, a conduit 1 of the vacuum system has its lower end connected to pumps, such as conventional mechanical and oil-diffusion pumps, and its upper end connected to a vacuum chamber. Preferably, the lower end 2 and the upper end 3 are each provided with flanges between which is inserted a trap 4 of my invention, trap 4 also having flanged portions 5, 6, which are bolted, as indicated, to the opposed flanges of conduit sections 2, 3. Trap 4 thus preferably comprises a straight tube 7 of a suitable metal which is T-shaped, having an abbreviated leg portion 8 attached at its midpoint. A pair of sleeves 9, 10 having internal threaded portions, are brazed to the inside of pipe 7. Two hemispherical polished reflectors with inner trapping surface members 11, 12 have external threads which engage the internal threads of sleeves 9, 10, respectively. In order to permit the flow of gases through the region defined by reflectors 11, 12 they are provided with central longitudinal apertures 13 across which are supported, as by means of legs 14, baffle means comprising curved cap reflectors 15. Members 11, 12, and 15 preferably are formed of a suitable metallic material, such as, for example, stainless steel.

Positioned within the opposed surface of reflectors 11, 12, 15 is a source of radiant energy. In accordance with my invention such radiant energy may comprise either electrons or photons, the latter being illustrated in the drawing. For this purpose, a tube 16 passes through leg portion 8 into the center of tube 7. Tube 16 may be formed of quartz and is sealed at its point of passage through leg 8 by means of O-rings 17, 18. A clamping arrangement comprising flange 19 on leg 8 and a clamping ring 20, together with bolts 21 provides an arrangement for compressing O-ring 18 so that a vacuum type seal is created around tube 16.

Preferably, tube 16 is formed of quartz and contains therein an ultraviolet lamp 22 of a conventional type. As mentioned previously, the radiant energy provided between reflectors 11, 12 may also comprise a source of electrons. In such a structure, quartz tube 16 is omitted from the trap structure, a filament is substituted for ultraviolet lamp 22 and is provided through leads sealed in neck 8 with a heating source and a biasing source in a conventional manner to bias the filament negative with respect to reflectors 11, 12, and 15. As will be obvious to persons familiar with any such conventional type of structure, the system must be evacuated to a pressure below about $10^{-5}$ torr before the filament is energized. Since ultraviolet irradiation may be left on even when the system is not evacuated it offers simplicity in operation although possibly posing greater sealing problems.

In the operation of the trap for a vacuum system of my invention, the flow path of unsaturated organic molecules traveling through the trap is altered by the baffle arrangement so that the molecules strike hemispherical reflectors 11, 12, and cap reflectors 15 which are irradiated with the ultraviolet light or with electrons and are polymerized through the action of such radiant energy. Also, as mentioned previously, the lifetime of molecules can be extended by cooling the trap, such as by cooling coils 23 which encircle pipe 7 and are provided with a cooling fluid from any suitable source. Also, preferably, such cooling is not at too low a temperature so that any unpolymerized molecules are not completely immobilized in the region, but are able to deposit on the reflector surfaces so that they can be polymerized when two such molecules and a photon or electron arrive at the same place on the surface at the same time.

Since the accumulation of polymerized film may eventually decrease the effectiveness of my trap, its construction is such that it is easily replaced or removed for renewal of the surface. Thus, by merely uncoupling flanges 5 and 6 from the pipe lengths 2 and 3, the entire trap may be removed and the reflecting surfaces 11, 12, and 15 removed from the inside of tube 7. Similarly, the construction of the ultraviolet source comprising quartz tube 16 and lamp 22 facilitates replacement of the easily accessible lamp 22.

In the operation of a vacuum system employing my improved trap for organic vapor, when an ultraviolet light source 22 is used, the pressure may be reduced from a value of $10^{-3}$ to $10^{-4}$ torr without the trap to a value of $10^{-7}$ to $10^{-8}$ torr with the trap employing O-rings for sealing the quartz tube 16 in position. When the O-rings are replaced by a more effective seal, such as a metal spinning, or when an electron source is employed and is sealed within tube 7, a vacuum of $10^{-10}$ to $10^{-11}$ torr may be obtained.

In the foregoing it is apparent that the present invention provides an economical, easily replaceable trap for organic vapors in a vacuum system. The removal of organic vapors is accomplished effectively by the optically opaque arrangement of the metallic reflectors 11, 12, 15 which cause organic molecules to deposit on these reflectors where they are polymerized through the action of the photons or electrons so that they are permanently immobilized and do not pass on to the evacuated region to raise the pressure in such region. The trap is very economical and useable in conjunction with other pumping devices for conveniently providing vacuum conditions with a maximum of convenience and economy with the absence of moving parts.

While I have shown and described several embodiments of my invention, it will be apparent to those skilled in the art that many changes and modifications may be made without departing from my invention in its broader aspects and I, therefore, intend the appended claims to cover all such changes and modifications as fall within the true spirit and scope of my invention.

What I claim as new and desire to secure by Letters Patent of the United States is:

1. In a vacuum system subject to organic vapors the method of removing such vapors from the system which comprises
causing molecules of the vapors to be deposited on a surface and subjecting such molecules to radiant energy to cause polymerization thereof.

2. The method of claim 1 in which deposited molecules are irradiated with ultraviolet energy.

3. The method of claim 1 in which deposited molecules are irradiated with electrons.

4. The method of claim 1 in which a reverse flow path is introduced into the vacuum system to facilitate the deposit of molecules on the walls of such path.

5. In a vacuum system in which organic vapors flow between two spaced points in the system, a trap for such vapors comprising
baffle means between such two points and positioned to alter the flow path of such vapors,
a surface positioned to receive such vapors,
and means for subjecting said surface to radiant energy to polymerize organic vapors deposited thereon.

6. The trap of claim 5 in which the baffle means comprises
a pair of opposed hemispherical members having longitudinally spaced openings and a pair of cap members over such openings spaced from the walls of the hemispherical members.

7. The trap of claim 6 in which a source of radiant energy is positioned substantially at the center of said hemispherical members.

8. The trap of claim 7 in which the radiant energy source comprises an ultra violet source.

9. The trap of claim 6 in which the radiant energy source comprises a source of electrons.

10. The trap of claim 5 which includes a tubular pipe member adapted to be connected in a vacuum system, said pipe member includes a pair of threaded sleeves and said baffle means comprises a pair of hemispherical members having longitudinal apertures threadedly engaged within said sleeves, baffle means spaced from the walls of said hemispherical members and overlying said longitudinal apertures, and said radiant energy means comprises a radiant energy source positioned substantially at the centers of such hemispherical surfaces whereby organic vapors are deflected by said baffle means and caused to be deposited on said hemispherical surface for polymerization by radiant energy from said source.

11. The trap of claim 7 which includes means surrounding said trap for cooling vapors flowing therethrough.

References Cited

UNITED STATES PATENTS

| 2,611,268 | 9/1952 | Mellen. | |
| 3,200,569 | 8/1965 | Wheeler | 230—69 XR |
| 3,367,564 | 2/1968 | Lloyd | 230—69 |
| 3,381,890 | 5/1968 | Hayashi | 230—69 |

ROBERT M. WALKER, Primary Examiner

U.S. Cl. X.R.

230—202